Patented Oct. 12, 1937

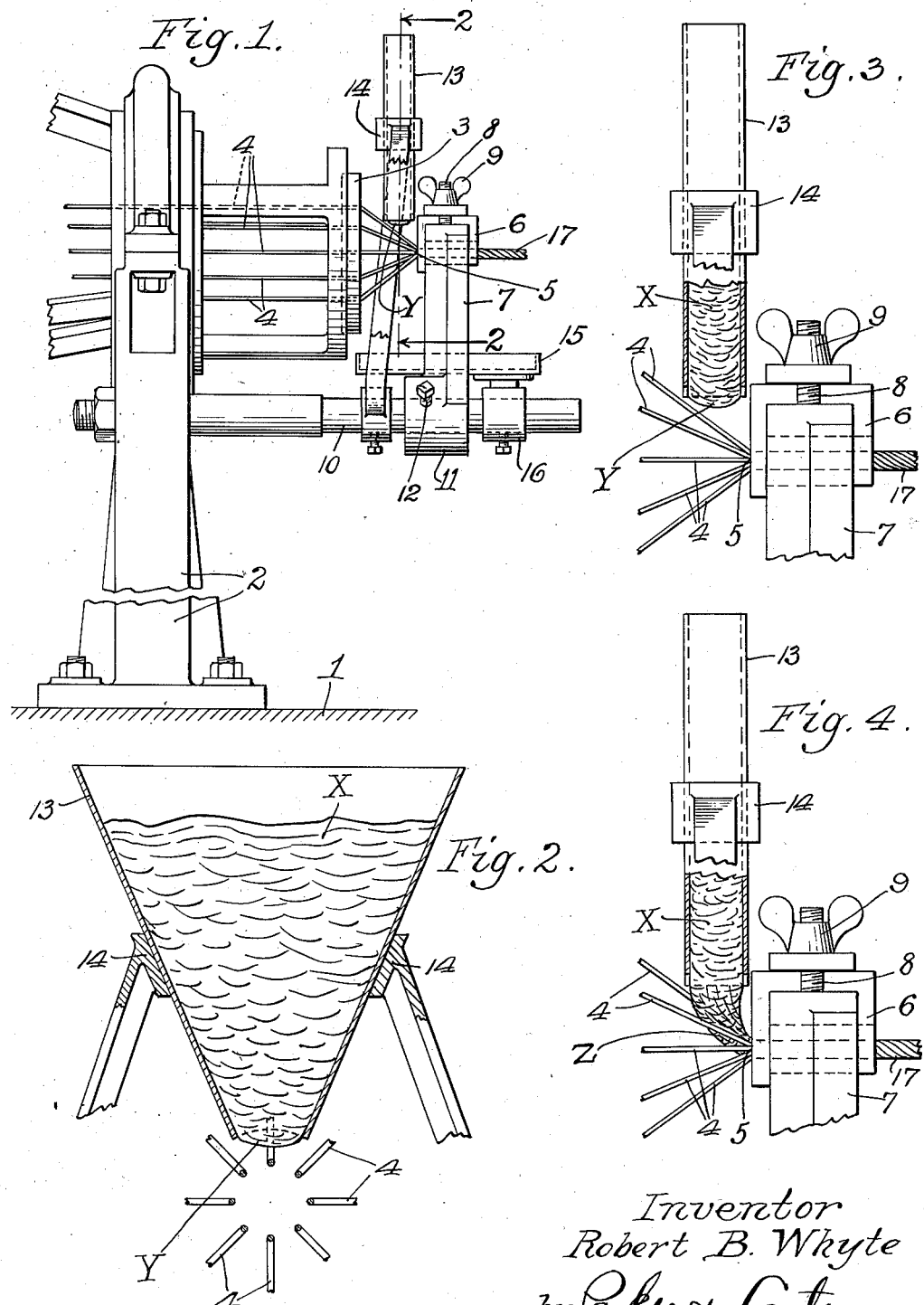

2,095,461

UNITED STATES PATENT OFFICE 2,095,461

METHOD OF LUBRICATING WIRE ROPE

Robert B. Whyte, Kenosha, Wis., assignor to Macwhyte Company, Kenosha, Wis., a corporation of Illinois Application July 14, 1937, Serial No. 153,551

7 Claims. (Cl. 117—2)

This invention relates to a method of applying lubricant to a wire rope during the course of its manufacture.

It has for one object to provide a method and an apparatus by means of which a grease or other lubricant of such consistency that it will not "run" or flow at ordinary room temperatures may be readily applied. Another object is to provide a method and an apparatus in which the wires of the rope itself provide the force for drawing lubricant from a container and carrying it into the rope so that the rope, as formed, is provided with internal lubrication.

Other objects will appear from time to time in the specification and claims.

The invention is illustrated more or less diagrammatically in the accompanying drawing, wherein:—

Figure 1 is a side elevation of one end of a rope making machine with parts omitted and parts broken away;

Figure 2 is a transverse sectional detail taken on an enlarged scale at line 2—2 of Figure 1, illustrating the lubricant container and one arrangement of wires;

Figure 3 is a side elevation on an enlarged scale with parts in section and parts broken away, showing the condition of the lubricant when the wires are stationary or not passing through the machine;

Figure 4 is a view similar to Figure 3 illustrating the condition of the lubricant when the machine is in operation and when the wires are passing through and drawing the lubricant into the rope as it is formed.

Like parts are designated by like numerals throughout the specification and drawing.

1 is a foundation or floor of any suitable nature. 2 is a standard supported upon the foundation and carrying and positioning a portion at least of the rope making machine. The details of the machine are not fully shown as they form no essential part of the invention which may be applied to almost any rope making machine. 3 is a forming member which is mounted for rotation and is driven in any desired manner and through which pass a number of strands 4. The strands are joined at or approximately at the point 5 where they enter a forming die 6. This die may be of any suitable form and its details form no essential part of the present invention. It is carried in a frame member 7 and is preferably removably held in position therein by a locking and adjusting screw 8 upon which a thumb nut 9 may be mounted. One or more rods 10 may be mounted preferably on the standard 2 although they may be carried from an independent support if desirable. As shown the rod or rods 10 project outwardly from the standard and serve to support the frame 7 which is provided with a portion 11 fitting upon and embracing the rod 10 and held in place by one or more set screws 12.

13 is a lubricant tank or container carried by means of a support 14 from the rod or rods 10. It is ordinarily preferable to support this container in the manner shown but it might be supported in any other manner so long as it is properly positioned with respect to the wires and the rope to furnish lubricant at the desired point. The lubricant is indicated generally at X. Beneath the lubricant container may be positioned a pan or other catching means 15 which as here shown is supported from the rod or rods 10 by members 16.

As shown, the lubricant container 13 is generally flat and tapers to a reduced opening at its bottom but it might be of almost any other desired shape.

As shown in Figures 2 and 3 the lubricant is not moving out of the container. The type of lubricant to the use of which the present invention relates is one which will not of itself or by the force of gravity flow under normal room or working temperatures. The apparatus and method of the present invention provide means and a method of applying this lubricant cold. When the word "cold" is used in the specification and claims it means that the lubricant is not heated in the sense of having been heated by definite heating means. Frequently in rope factories the temperature of the room may be relatively high in summer but the lubricant does not run at these temperatures and would require definite additional heating to cause it to run or flow by gravity. As shown in Figures 2 and 3 it is not running and it requires a further force to cause the lubricant to pass out of the container onto the wires and into the rope. As shown particularly in Figure 3, the machine is stationary and neither the wires 4 nor the rope 17 are in motion. It is for that reason that the individual strands of the rope are visible.

As shown in Figure 4 the machine is in operation and the wires are moving, rotating about as the rope 17 is formed. The wires are shown clearly for purposes of illustration. In actual practice they move frequently with such rapidity that they cannot be individually seen with the clarity indicated in the drawing.

When the machine has been set in motion so that wire is passing through and rope is being formed, the operator pushes or pulls manually or by a paddle or other tool, some of the lubricant downwardly positively into contact with the moving wires. The nature of the lubricant is such that once it has been brought into contact with the moving wires further movement of the wires pulls the lubricant outward and continues to pull it and the general movement of the lubricant, as indicated at Z in Figure 4, continues so long as there is lubricant in the container and so long as the wires are kept in motion. The wires and their movement thus furnish the means and the force for drawing the lubricant out of the container and bringing it into contact with the wires and ultimately into the rope.

For purposes of simplicity, no core is shown, but it is to be understood that frequently ropes are formed with cores in addition to the wire strands and where such cores are built into the ropes they pass through the machine and pass the point of lubrication and into the rope.

While the present invention shows a so-called horizontal type of rope machine in which the wires and the rope move generally in a horizontal direction during manufacture, the invention could be applied to other types of machines. One of such types is the so-called vertical machine in which the wires and rope move for a while at least in a generally vertical direction. In connection with a machine of the vertical type, the lubricant container can be positioned adjacent the point of rope formation so as to be close to the wires as they pass into the die and when the machine is started the lubricant is positively forced into contact and engagement with the wires and thereafter further movement of the wires draws or pulls the lubricant into contact with the wires and finally into the rope in the manner generally above described. Since the lubricant does not flow by gravity and since gravity is, therefore, not relied upon in bringing the lubricant and the wires together, and since it is the wires themselves that furnish by their movement the force for drawing the lubricant out of the container, it is clear that the present invention may be applied to rope making irrespective of the direction in which the wires and rope move. While the horizontal and vertical types of machines have been mentioned, other angular arrangements are possible and the method of the present invention could be applied to a wide variety of possible angular positions and relationships.

During normal operation it is possible that excess of lubricant may be withdrawn from the container by the wires and some of the lubricant is, therefore, forced off the wires by the die or may even be forced off elsewhere and for that reason a pan or other member 15 is provided. The excess lubricant so forced off will be caught in this pan and from time to time be returned to the container. This may be by positive mechanical means or manually. As here shown no mechanical means are provided and in ordinary practice the manual return of the lubricant has proven adequate and successful but the mechanical means may be added if desired.

I claim:

1. The method of internally lubricating a wire rope during manufacture, which comprises the following steps: positioning a body of stiff lubricant adjacent a rope forming machine, setting the machine in motion, moving wires through said machine and past said lubricant, bringing a portion of the lubricant into engagement with the wires, continuing the operation of the rope making machine and causing the wires to move past said lubricant and to draw the lubricant out of the container progressively as they move past it.

2. The method of internally lubricating a wire rope during manufacture, which comprises the following steps: positioning a body of stiff lubricant adjacent a rope forming machine, setting the machine in motion, moving wires through said machine and past said lubricant, positively bring a portion of the lubricant into engagement with the wires, continuing the operation of the rope making machine and causing the wires to move past said lubricant and to draw the lubricant out of the container progressively as they move past it.

3. The method of internally lubricating a wire rope during manufacture, which comprises the following steps: positioning a body of stiff lubricant adjacent a rope forming machine, setting the machine in motion, moving wires through said machine and past said lubricant, bringing a portion of the lubricant into engagement with the wires, continuing the operation of the rope making machine and causing the wires to move past said lubricant and to draw the lubricant out of the container progressively as they move past it and to carry the lubricant into the rope.

4. The method of internally lubricating a wire rope during manufacture, which comprises the following steps: positioning a body of stiff lubricant adjacent a rope forming machine, setting the machine in motion, moving wires through said machine, and past said lubricant, positively bringing a portion of the lubricant into engagement with the wires, continuing the operation of the rope making machine and causing the wires to move past said lubricant and to draw the lubricant out of the container progressively as they move past it and to carry the lubricant into the rope.

5. The process of lubricating wire rope with a non-flowing, cold lubricant which comprises the following steps: moving the wires before the formation of the rope past a body of said lubricant, bringing a portion of said lubricant into engagement with said wires, causing said wires to continue to move and to continue to draw said lubricant progressively onto said wires, and finally into said rope as the latter is formed.

6. The process of lubricating wire rope with a non-flowing, cold lubricant which comprises the following steps: moving the wires before the formation of the rope past a body of said lubricant, initially positively bringing a portion of said lubricant into engagement with said wires, causing said wires to continue to move and to continue to draw said lubricant progressively onto said wires, and finally into said rope as the latter is formed.

7. The method of manufacturing an internally lubricated wire rope which comprises the following steps: moving the desired number of wire strands past a supply of stiff cold lubricant, bringing a portion of said lubricant positively into engagement with said wires, causing said wires to continue to move and to continue to draw said lubricant progressively with them, forming said wires into a rope and causing the wires as they are formed into the rope to carry said lubricant with them into the rope.

ROBERT B. WHYTE.